Dec. 17, 1935. R. SUMI ET AL 2,024,190
AUTOMOBILE PARKING AND STORAGE MACHINE
Filed Feb. 15, 1933   5 Sheets-Sheet 3

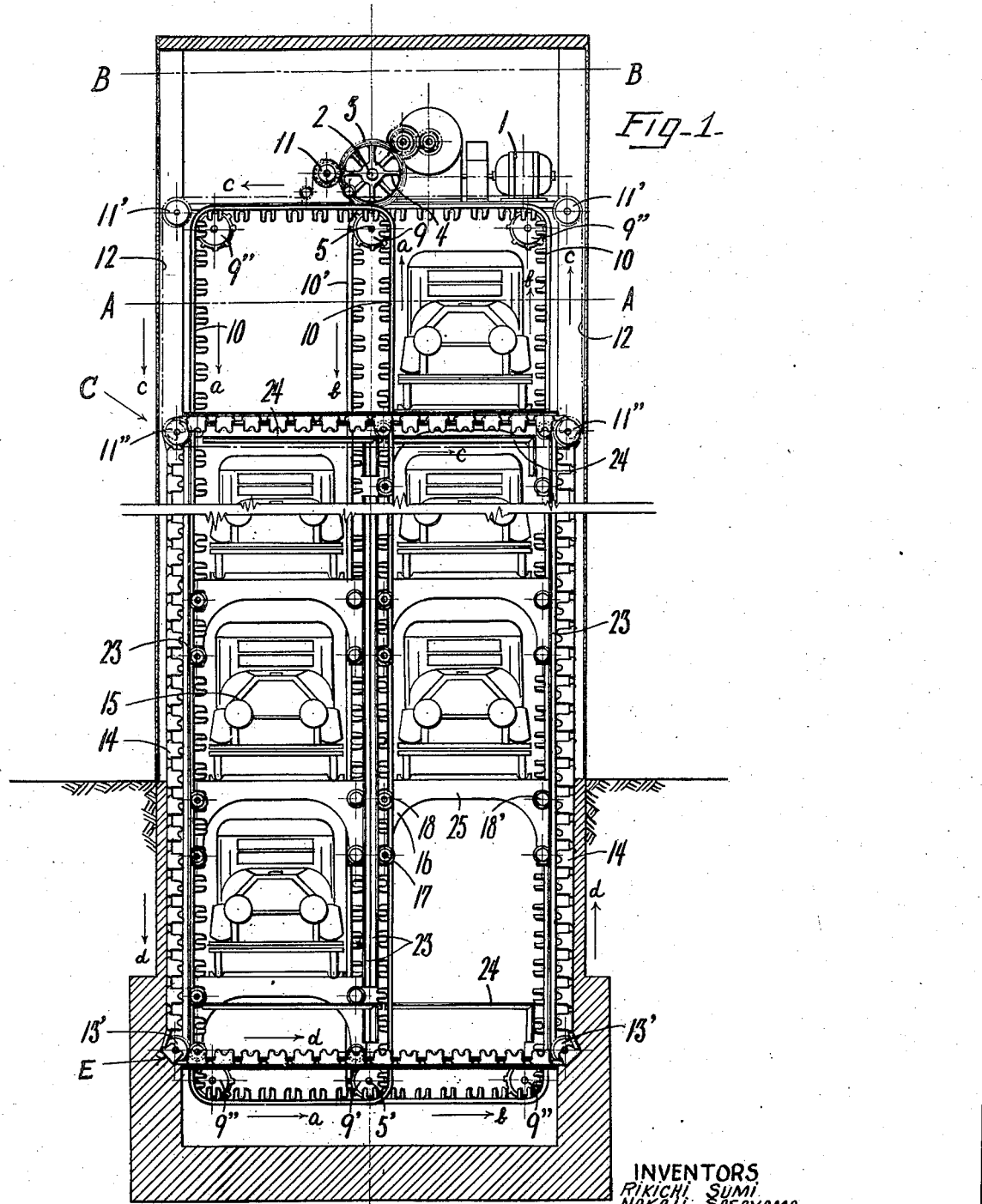

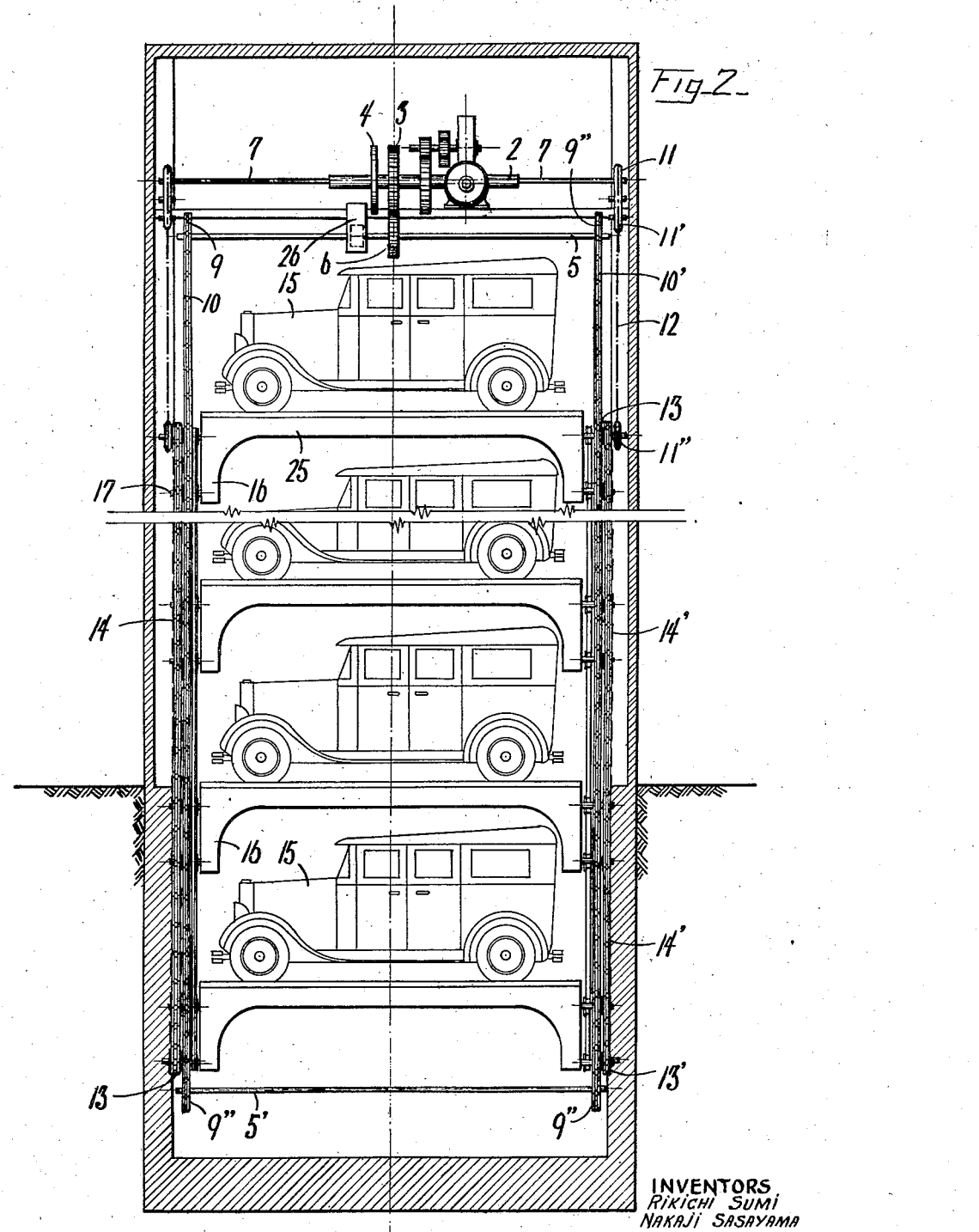

INVENTORS.
RIKICHI SUMI
NAKAJI SASAYAMA
BY Oscar A. Geier
ATTORNEY

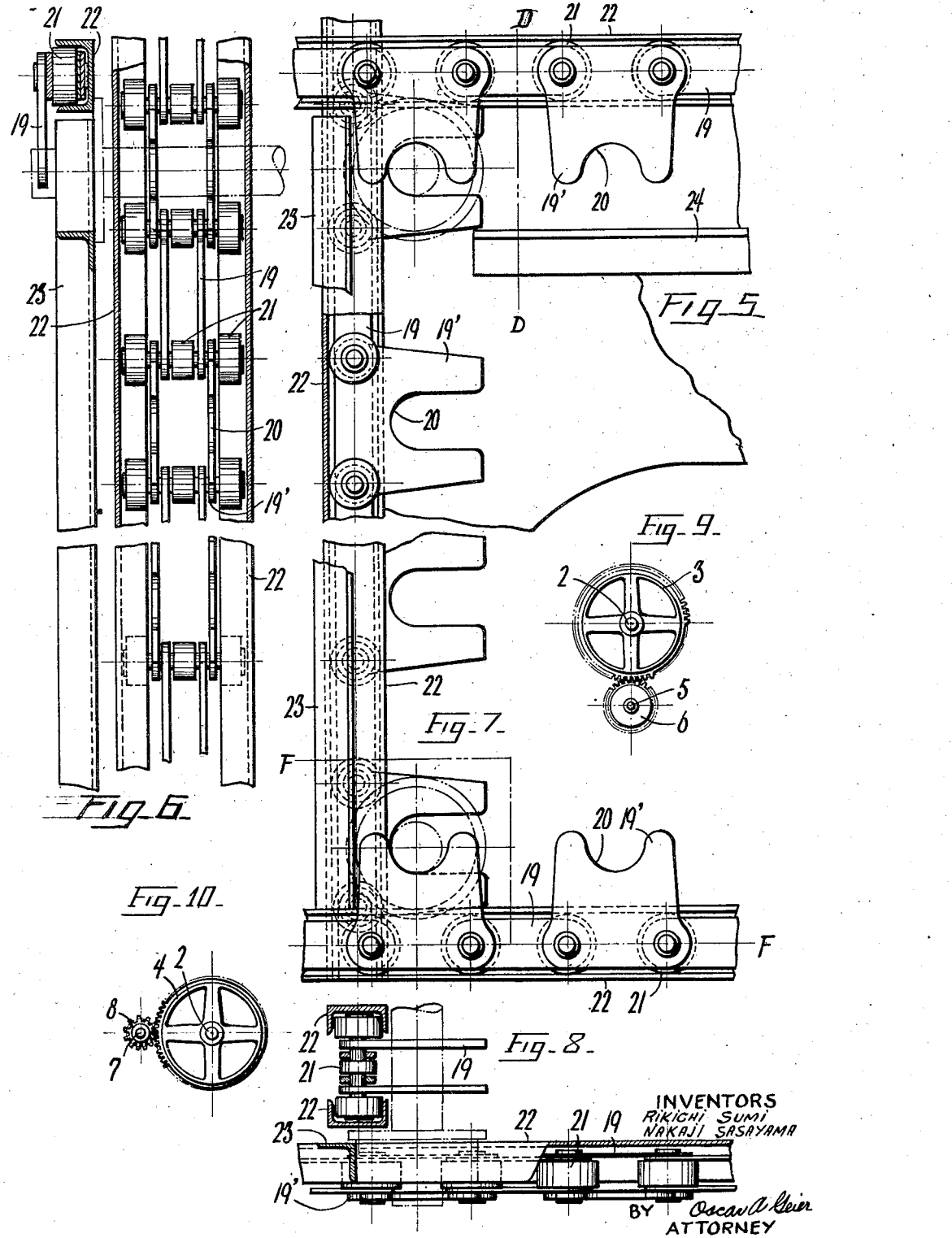

Dec. 17, 1935.  R. SUMI ET AL  2,024,190
AUTOMOBILE PARKING AND STORAGE MACHINE
Filed Feb. 15, 1933   5 Sheets-Sheet 5
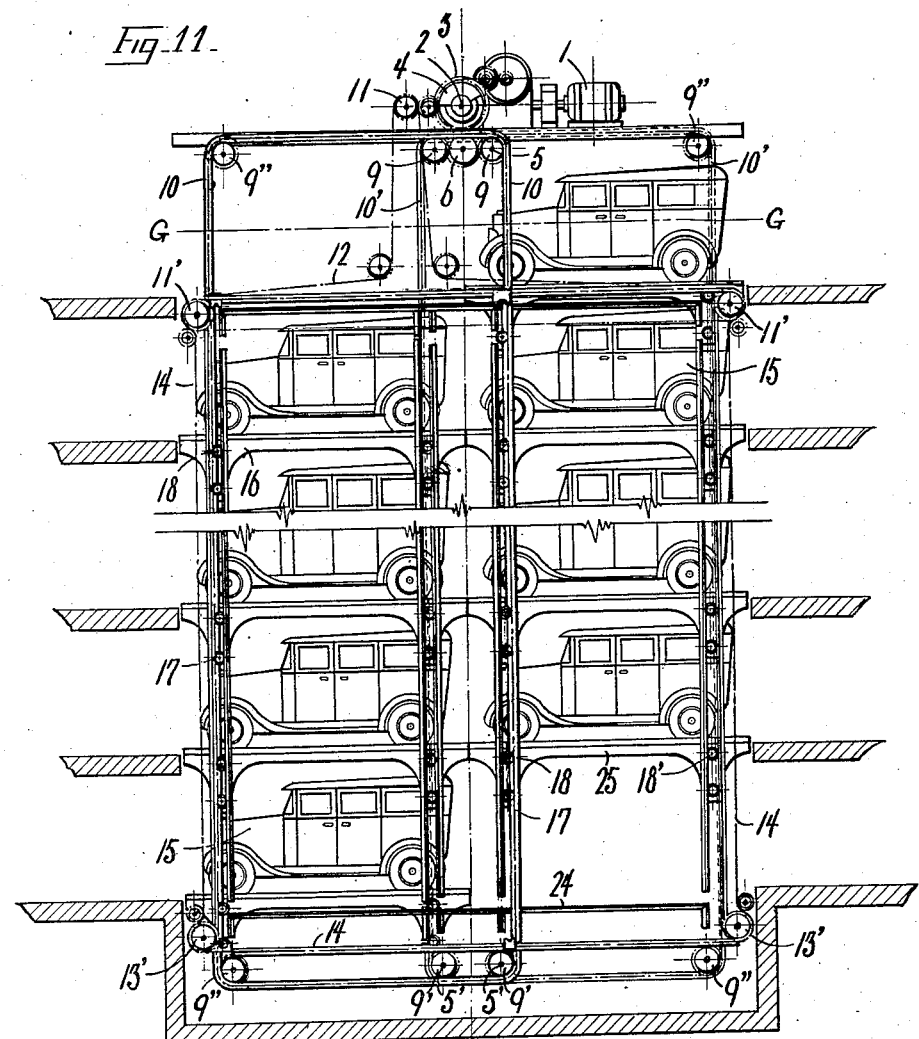
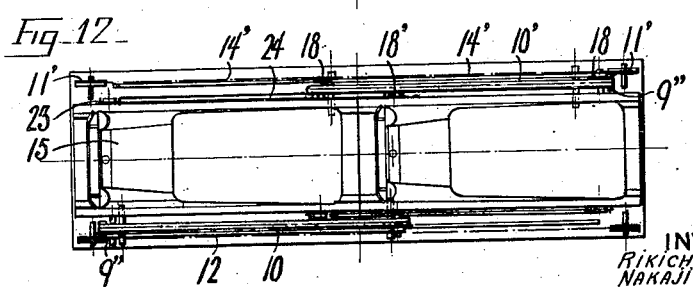

Patented Dec. 17, 1935

2,024,190

UNITED STATES PATENT OFFICE 2,024,190

AUTOMOBILE PARKING AND STORAGE MACHINE

Rikichi Sumi, Ohta Odamura Kawabegun Hyogoken, and Nakaji Sasayama, Kitanagasadori Kobeku Kobe, Japan Application February 15, 1933, Serial No. 656,804

2 Claims. (Cl. 214—16.1)

This invention relates to means for conveying and storaging automobiles and the like.

An object of the present invention is the provision of an automobile parking and storage machine by means of which the greatest possible number of automobiles may be received and stored in the smallest possible space.

The above and other objects of this invention may be realized through the provision of a device comprising platforms provided with fingers which are constantly supported while being rotated, by hook-like links of endless chains. The device is also provided with rollers loosely connected with these fingers and in contact with guiding rails, whereby a smooth movement is assured.

Automobile parking machines known in prior art comprise cages for the automobiles which are provided with arms or levers connecting the cages to the chains. These machines require a large space due to the fact that it is necessary to rotate either the upper part or the bottom part of the cages. This disadvantage is eliminated by the device constructed in accordance with the principles of the present invention.

According to the present invention the device is provided with a number of platforms suitable for storing automobiles and the device is so arranged that while these platforms are moved in a counter clockwise direction, they are first moved downward and then as each of the platforms reaches its lowest position, it is caused to move to the right; after a platform has completed its movement to the right, it is moved upward until it reaches its highest position then it is moved to the left and finally after it has completed this movement to the left, it is caused to move downward to its lowest position. In other words, each platform is caused to move downward, to the right, upward, to the left, and then downward again.

Each platform is operated as follows:

When a platform is moved vertically downward at the left hand side, it will stop momentarily in the course of this movement. As soon as another platform has completed its movement in a horizontal direction, the first-mentioned platform will resume its movement and will continue to move downward until it reaches its lowest point. Then it moves to the right in a horizontal direction and as soon as this movement to the right is completed, it moves upward on the right hand side and then stops. Then it resumes its movement until it finally reaches the uppermost position. After that it moves to the left horizontally and then moves intermittently downward on the left hand side until it reaches its lowermost position. The length of the horizontal or vertical path of each platform corresponds to the distance from one platform to the next platform.

Cars are moved on to a platform or are taken away from a platform preferably when the platform is not moving and as soon as a car is placed upon a platform or removed therefrom, the motion of the platform is resumed. Furthermore, when a platform reaches a required position, the motor which pulls the endless chains may be stopped so that a motor car may be placed upon a platform or removed from it, and thereafter the motor may be switched on again.

It will be noted that in this device each platform is moved along straight lines and does not carry out a circular motion so that a large amount of space is saved. The platforms are comparatively light and all suspending levers or arms are eliminated. Since the platforms always extend horizontally, the automobiles may be removed at any position of the platform.

The invention will appear more clearly from the following detailed description when taken in connection with the accompanying drawings showing preferred embodiments of the inventive idea.

In the drawings:

Fig. 1 shows an automobile parking machine in front elevation.

Fig. 2 shows the same machine in side elevation.

Fig. 5 is an enlarged front elevation of the part C of Fig. 1.

Fig. 6 is a section along the line D—D of Fig. 5.

Fig. 7 is an enlarged front elevation of the part E of Fig. 1.

Fig. 8 is a horizontal section along the line F—F of Fig. 7.

Figs. 9 and 10 show in side elevation the partial segment gears used for power transmission purposes.

Fig. 11 is a side elevation of a device wherein the motor cars are moved in the front and rear directions.

Fig. 12 shows a horizontal section of Fig. 11 on the line G—G.

Figure 4:
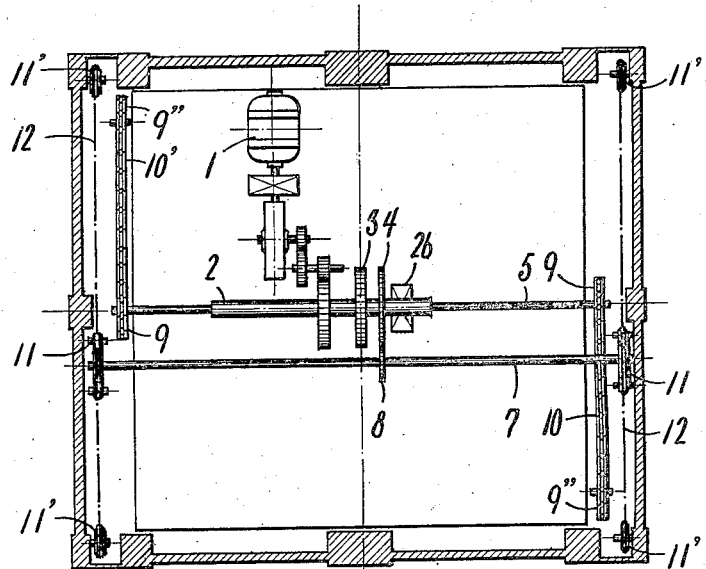
Fig. 4 is a horizontal section along the line B—B of Fig. 1.

The machine shown in the drawings comprises an electrical motor 1 placed on the top board of a rectangular column. The motor 1 drives the main shaft 2. Two partial segment gears 3 and 4 are secured to the main shaft 2. The first partial segment gear 3 is shown more clearly in Fig. 9 of the drawings, some teeth of this gear being removed. The second partial segment gear 4 is shown more clearly in Fig. 10 of the drawings, with its teeth partially fitted. The first partial segment gear 3 meshes with a pinion 6 mounted upon a shaft 5. The second partial segment gear 4 meshes with another pinion 8 fixed upon a shaft 7. Sprocket wheels 9 are attached to the two ends of the shaft 5. Another shaft 5' is situated directly below the shaft 5 and carries sprocket wheels 9' which are situated directly underneath the sprocket wheels 9. Other sprocket wheels 9'' are situated on the horizontal level corresponding to the sprocket wheels 9 and 9', both in the front left hand side and the rear right hand side, looking in the direction of Fig. 1. An endless chain 10 is in engagement with four sprocket wheels consisting of the aforementioned sprocket wheels 9', 9 and two other sprocket wheels 9'' situated at the upper left hand side and the lower left hand side, respectively. Another endless chain 10' which is similar to the chain 10 is in engagement with the rear sprocket wheels 9', 9, and two sprocket wheels situated at the right hand side.

Sprocket wheels 11 are carried by the two ends of the shaft 7. Two other sprocket wheels 11' are situated on the left hand side and the right hand side, respectively, of the sprocket wheels 11, and are located on the top, somewhat outwardly of the sprocket wheels 9''. Two sprocket wheels 11'' are situated perpendicularly below the sprocket wheels 11' and are in engagement with an endless chain 12. The sprocket wheels 11'' are placed in such a manner that they correspond to the highest point which a platform 25 would reach when rising.

The same shaft which carries the sprocket wheels 11'' also carries sprocket wheels 13. Sprocket wheels 13' are situated perpendicularly below the sprocket wheels 13, somewhat lower than the lowest stopping position of the platform. A separate endless chain 14 is in engagement with the sprocket wheels 11'', 13 and 13'. The sprocket wheels 13 should be located somewhat outside of the upper part of the sprocket wheels 9''.

When the electric motor 1 is started it will drive the endless chains in different directions, namely, the chain 10 will move in the direction of the arrow $a$, the chain 10' will move in the direction of the arrow $b$, the chain 12 will move in the direction of the arrow $c$ and the chain 14 will move in the direction of the arrow $d$. However, the speed of all these chains will be the same. While the endless chains 10, 10' are moved, the endless chain 12 will remain immovable, and consequently the chain 14 also will not move. In the same manner, while the chains 12 and 14 are moving the chains 10 and 10' will not move. The duration of motion of all of these chains is determined by the number of teeth of the two partial segment gears, as well as the position of the teeth of these gears. In fact, the movement of the chains 10, 10' and 14 depend on the two partial segment gears and the pinions meshing with these gears.

Figure 3:
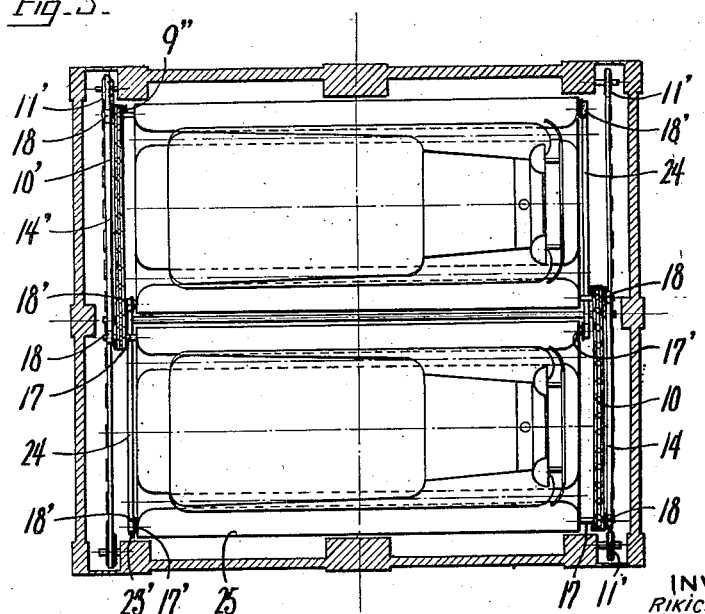
Fig. 3 is a horizontal section along the line A—A of Fig. 1.

The platform 25 comprises a flat board adapted to support an automobile 15. Brackets 16 are attached to both the front side and the rear side of the flat board. As shown in Figs. 1 and 3, the outer side of each bracket is provided with long fingers 17 projecting at the front left hand side and the rear right hand side. Other fingers 17 are located at the front right hand side and the rear left hand side. The fingers 17 and 17' carry rollers 18 and 18', respectively, which are rotatably mounted in these fingers.

The endless chains 10, 10' and 14 are connected by means of suitable pins with the links 19 and 19' having hooklike members 20. The pins carry rollers 21 which travel along inner surfaces of guide plates 22, preferably made of angle steel. Other guide plates 23 which are parallel to the guide plates 22 are in contact with a roller 18 which is loosely attached to the longer fingers 17. The fingers 17 are supported by hook-like members 20 which operate jointly with the endless chains.

When a number of platforms are to be moved at regular intervals, the longer fingers 17 at the front left hand side are supported by the endless chain 10, while the longer fingers 17 at the rear left hand side are supported by the hook-like members of the chain 10'. In that case, the rollers 18 and 18' will move vertically after they have come in contact with the guide plates 23 and 23', respectively, (Fig. 3). When these rollers stop, after having reached the lowermost position, the longer fingers 17 below will be supported by the hook-like members connected to the endless chain 14, (Figs. 1 and 7), while the longer fingers in the upper part will not be supported at all. As soon as the longer fingers 17 will be supported by the hook-like members of the chain 14, the chain 14 will move in the direction of the arrow $d$. Furthermore, when the platform is moved a little, the rollers 18 which are loosely mounted on the upper fingers 17, will be supported by the horizontal rail 24. Consequently, the platform will move from the left hand side, as shown in Fig. 1, to the right hand side. As soon as the long fingers 17 come into engagement with the hook-like members of the endless chains 10, 10', the movement of the chain 14 will stop and the chains 10, 10' will begin to move. In other words, the platform after descending perpendicularly on the left side, will move horizontally to the right and then ascend vertically on the right hand side. Simultaneously, the platform which is situated at its upper stopping position of the right hand side will move to the left. When the upper longer fingers 17 will move to the left they will be supported by the hook-like members and the rollers 18 carried by these fingers will slide over the rail 24.

The described machine is used for storing automobiles one above the other. A similar machine may be used for storing motor cars horizontally; in that case, the chains 10, 10' must be made shorter and the chain 14 longer. A combination of both arrangements also may be used.

We claim as our invention:

1. In an automobile parking and storage machine, a platform comprising a board adapted to carry an automobile, and a bracket connected with said board; a finger carried by said bracket and extending substantially at right angles thereto, a roller rotatably mounted upon said finger, means adapted to contact said fingers for lowering said platform, moving it in a horizontal direction, raising it, and then moving it in the opposite horizontal direction, said lowering, raising and horizontal movements being carried out alternately, and means maintaining a contact with said roller while said platform is being moved.

whereby a smooth movement of said platform is assured.

2. In an automobile parking and storage machine, a platform comprising a board adapted to carry an automobile, and a bracket connected with said board; a finger carried by said bracket, another substantially shorter finger carried by said bracket, a separate roller rotatably mounted upon each finger, guide rails comprising two sets of outer and inner rails disposed vertically and horizontally and forming a rectangular course in front of and behind said platform, the first-mentioned roller being adapted to roll on the outer rails, the second-mentioned roller being adapted to roll on the inner rails, and means adapted to contact said fingers for lowering said platform, moving it in a horizontal direction, raising it, and then moving it in the opposite horizontal direction, said lowering, raising and horizontal movements being carried out alternately.

RIKICHI SUMI.
NAKAJI SASAYAMA.